(12) United States Patent
Perol

(10) Patent No.: US 6,292,375 B1
(45) Date of Patent: Sep. 18, 2001

(54) DC-DC VOLTAGE CONVERTER CAPABLE OF PROTECTING AGAINST SHORT CIRCUITS

(75) Inventor: Alfred Philippe Perol, The Hague (NL)

(73) Assignee: Agence Spatiale Europeenne, Paris (FR)

( * ) Notice: Subject to any disclaimer, the term of this patent is extended or adjusted under 35 U.S.C. 154(b) by 0 days.

(21) Appl. No.: 09/744,741

(22) PCT Filed: Aug. 4, 1999

(86) PCT No.: PCT/FR99/01926

§ 371 Date: Jan. 29, 2001

§ 102(e) Date: Jan. 29, 2001

(87) PCT Pub. No.: WO00/08743

PCT Pub. Date: Feb. 17, 2000

(30) Foreign Application Priority Data

Aug. 5, 1998 (FR) .................................................. 98 10049

(51) Int. Cl.$^7$ .................................................. H02M 3/335
(52) U.S. Cl. ...................................... 363/21.01; 363/56.09
(58) Field of Search .................................. 363/15, 16, 20, 363/21.01, 56.09, 56.1, 56.11, 95, 97, 98, 131

(56) References Cited

U.S. PATENT DOCUMENTS

| | | |
|---|---|---|
| 4,199,807 | 4/1980 | Crowe et al. . |
| 4,663,699 * | 5/1987 | Wilkinson ............................. 363/17 |
| 4,809,310 * | 2/1989 | Salesses et al. ..................... 378/109 |
| 5,068,573 * | 11/1991 | Bruning et al. ................ 315/209 R |
| 5,325,283 | 6/1994 | Farrington et al. . |
| 5,646,836 * | 7/1997 | Sadarnac et al. ...................... 363/98 |
| 5,771,159 * | 6/1998 | Sako et al. ............................. 363/17 |
| 5,946,200 * | 8/1999 | Kim et al. .............................. 363/17 |
| 5,946,208 * | 8/1999 | Yamamoto et al. ................. 363/132 |

FOREIGN PATENT DOCUMENTS

| | | |
|---|---|---|
| 24 16 985 | 10/1975 | (DE) . |
| 517 226 | 12/1992 | (EP) . |
| 797 289 | 9/1997 | (EP) . |

OTHER PUBLICATIONS

"Analysis of a Half–Bridge type Series Resonant DC–DC Converter with Auxiliary Switches" by Asano et al., EPE 1995 6$^{th}$ European Conf. On Power Electronics and Applications, vol. 2,No. CONF. 6.

"Steady State Analysis and Design Optimization of an Inductor–Transformer Resnant DC–DC Conveter" by Kojori et al, vol. 1, No. 87ch2499–2, Oct. 1987.

\* cited by examiner

*Primary Examiner*—Adolf Deneke Berhane
(74) *Attorney, Agent, or Firm*—Sughrue, Mion, Zinn, Macpeak & Seas, PLLC

(57) ABSTRACT

The invention relates to a DC voltage converter comprising first and second input terminals for receiving an input voltage, a choke component having a first terminal coupled to the first input terminal and a second terminal coupled to a first terminal of a capacitive branch which has a second terminal coupled to the second input terminal, first and second switches controlled in opposition, and an output transformer having a primary and a secondary feeding a load. The capacitive branch presents two capacitive components connected in series with the common terminal thereof being coupled to a first terminal of the primary of said output transformer. The first and second switches are connected in series and present a common terminal coupled to a second terminal of the primary of said output transformer, the other terminals of the first and second switches being coupled respectively to the first and second terminals of the capacitive branch.

9 Claims, 2 Drawing Sheets

DC-DC VOLTAGE CONVERTER CAPABLE OF PROTECTING AGAINST SHORT CIRCUITS

The present invention relates to a DC-DC voltage converter of the resonant type, usable in particular for powering travelling wave tubes (TWT), and it relates more particularly to a converter which switches at zero voltage and at zero current.

BACKGROUND OF THE INVENTION

U.S. Pat. No. 4,959,765 in the name of the Applicant describes a layout corresponding to a resonant converter which switches at zero voltage and at zero current.

In particular, that patent describes a push-pull type device in which the resonant circuit is constituted by a current feed capacitor and by the leakage inductance of the transformer.

That converter is not protected against an accidental short circuit of one of the switches in the push-pull version, or of the sole switch in the other version described.

To obtain a zero voltage switch, the switch of one push-pull branch should be closed only after the switch in the other branch has been opened and the voltage across the terminals of said switch has reached its high value due to the magnetization energy of the transformer, and has reached its low value at the switch which is to be closed under the action of the transformer.

U.S. Pat. 5,140,512 (O'Sullivan) enables such switching at zero voltage to be obtained automatically by detecting the voltage excursion of the transformer. A detection logic circuit is associated with each push-pull switch and alternating push-pull operation is authorized only when the transformer has switched within a time interval during which both push-pull switches are open.

Finally, U.S. Pat. No. 5,249,113 in the name of the Applicant describes a converter having a transformer which enables a rapid transition to be obtained and provides good operation for the layout when the switches are insulated grid field effect transistors (MOSFET) which present high drain-source capacitance tending significantly to slow down the automatic switching of the transformer, or which are responsible for an unfavorable form factor of the current and for poor efficiency. Adjusting the magnetization current of the transformer which does not change the resonance characteristic of the transformer serves to increase the switching speed of the transformer, thereby improving the form factor and the efficiency.

By implementing the three above-cited patents simultaneously, it is possible to make converters having efficiency of 97% or more on a bus regulated at 50 V. Such converters nevertheless require input protection in the event of a short circuit fault, which gives rise to greater complexity.

OBJECTS AND SUMMARY OF THE INVENTION

The object of the present invention is to provide a converter layout which is usable in practice on buses with voltages of up to about 100 V, and which is capable of being protected against short circuits without significant complication, thereby also making it possible to limit the current passing through the load.

The invention thus provides a DC voltage converter comprising first and second input terminals for receiving an input voltage, a choke component having a first terminal coupled to the first input terminal and a second terminal coupled to a first terminal of a capacitive branch which has a second terminal coupled to the second input terminal, first and second switches controlled in opposition, and an output transformer having a primary and a secondary feeding a load, wherein the capacitive branch presents two capacitive components connected in series with the common terminal thereof being coupled to a first terminal of the primary of said output transformer, wherein the first and second switches are connected in series and present a common terminal coupled to a second terminal of the primary of said output transformer, the other terminals of the first and second switches being coupled respectively to the first and second terminals of the capacitive branch.

In order to obtain mutual protection of the switches against short circuits, the converter has zero voltage switching control on the basis of the voltage at the terminal common to the first and second switches.

In order to obtain automatic protection against an accidental short circuit of a switch, the converter can include a device for measuring the current flowing through said choke component and a comparator comparing said measured current with a reference maximum current, and having its output coupled to a control device which controls opening of the first and second switches whenever the measured current exceeds said reference maximum current.

Said comparator is preferably a comparator with hysteresis.

In a variant enabling an additional voltage adjustment command, the converter has third and fourth switches connected in series and presenting a common terminal coupled to the first terminal of the primary of an auxiliary transformer, the other terminals of the third and fourth switches being coupled respectively to the first and second terminals of the capacitive branch, and the auxiliary transformer presents a secondary connected in series with the primary of the output transformer between the terminal common to the two capacitive elements and the terminal common to the first and second switches. The converter can then include a voltage adjustment device for controlling the third and fourth switches as a function of voltage, either in an additive first mode in which the third and fourth switches are controlled synchronously with the first and second switches respectively, or in a subtractive second mode in which the third and fourth switches are controlled in phase opposition,with the first and second switches respectively.

In a preferred embodiment of this variant, the voltage adjustment device comprises first and second threshold comparators and a control unit for controlling the third and fourth switches so as to cause the third and fourth switches to operate at least in the first and second modes, the first and second threshold comparators having respective first input terminals receiving a signal representative of said input voltage and respective second input terminals receiving signals representative respectively of a high threshold and of a low threshold and presenting respective control outputs applied to inputs of the control unit for causing the control unit to operate in said first mode and in said second mode, respectively.

At least one of said threshold comparators is advantageously a comparator with hysteresis.

In another variant, the phases of the third and fourth switches are offset relative to the phases of the first and second switches, respectively, as a function of said input voltage.

BRIEF DESCRIPTION OF THE DRAWINGS

The invention will be better understood on reading the following description with reference to the accompanying drawings, in which.

MORE DETAILED DESCRIPTION

Figure 1:
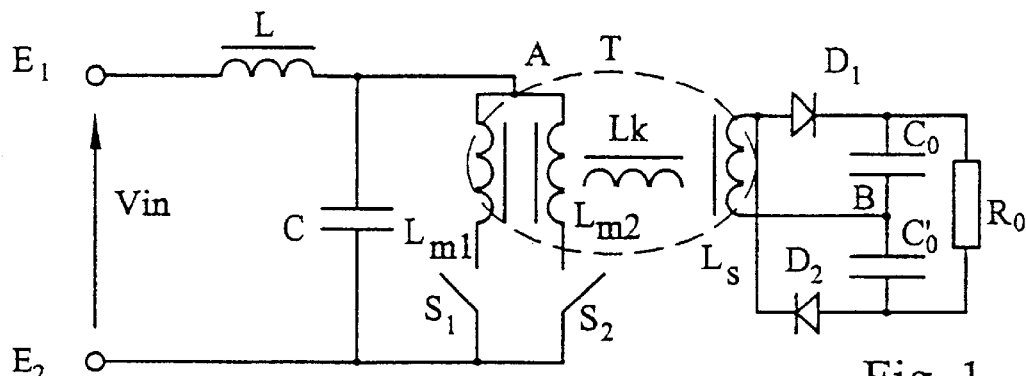
FIG. 1 shows the technique implemented in above-mentioned U.S. Pat. No. 4,959,765.

In FIG. 1, the converter corresponding to the concept described in above-mentioned U.S. Pat. No. 4,959,765 presents an input choke L having one terminal connected to a first input terminal $E_1$ of the converter and having its other terminal connected to one terminal of a capacitor C whose other terminal is connected to the second input terminal $E_2$ of the converter. The converter also has a transformer T with two windings $Lm_1$ and $Lm_2$ with a common point A connected to the point common to the choke L and the capacitor C. Two switches $S_1$ and $S_2$ are connected between the respective opposite terminals of the windings $Lm_1$ and $Lm_2$ and the second input terminal $E_2$ of the converter. An input voltage Vin is applied to the input terminal $E_1$ and $E_2$ of the converter. The transformer T has a secondary winding Ls which feeds a load represented by a resistor $R_0$. By way of example, the secondary Ls has a diode $D_1$ connected to conduct forwards from one of the terminals of the secondary Ls and a terminal of a capacitor $C_0$ which is in series with a capacitor $C'_0$. The common point B between the two capacitors is connected to the other terminal of the secondary Ls and the second terminal of the capacitor $C'_0$ remote from said common point B is connected to the anode of a diode $D_2$ which is reverse-connected between the first terminal of the secondary Ls and the second terminal of the capacitor $C'_0$.

The resonant circuit comprises the power supply capacitor C and the leakage inductance Lk of the transformer T. In the event of failure due to one or other of the switches $S_1$ and $S_2$ being short-circuited, that circuit presents no protection.

Figure 2:
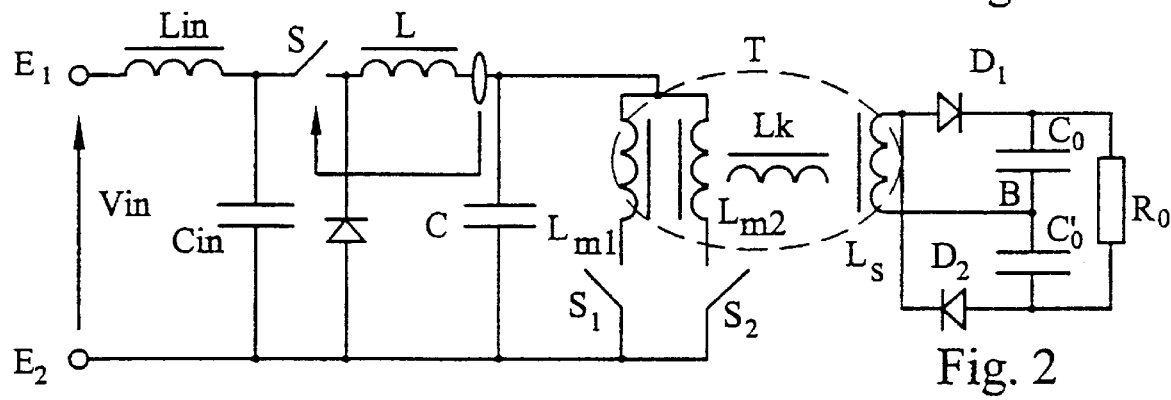
FIG. 2 shows a circuit presenting anti-short-circuit protection that is suitable for the FIG. 1 circuit.

FIG. 2 shows an embodiment enabling such protection to be provided. It requires a series switch S to be added together with a reverse-connected diode D between the point common to the switch S and the inductance L and the second input terminal $E_2$ of the converter. This diode D enables the current loop in the choke L to be closed. Implementing this protection also implies the addition of an input filter (Lin, Cin).

The technological trend towards power supply bus line voltages of about 100 V, as is the case for the power supply buses of so-called "high power" telecommunications, is having the effect that the above-described push-pull type layout is no longer optimal since it requires transistors of higher nominal voltage and leads to greater losses.

Figure 3:
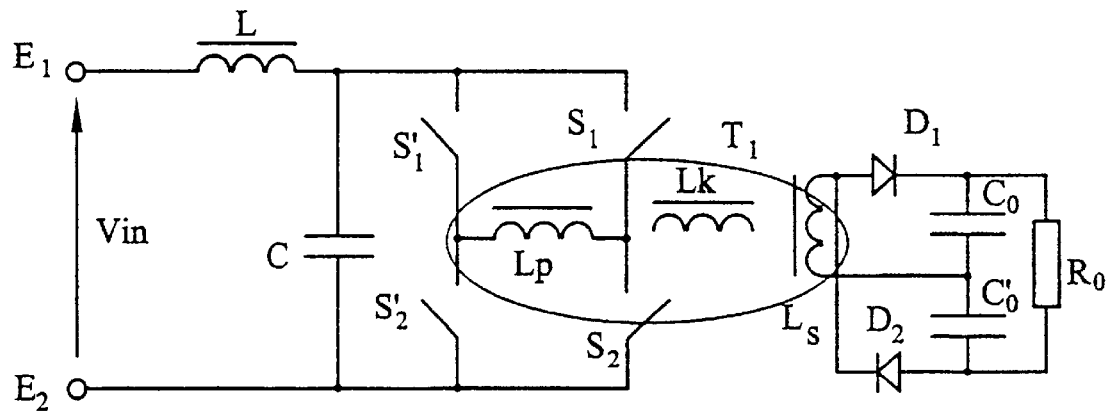
FIG. 3 shows by way of illustration a converter having a switch bridge configuration.

By way of illustration, FIG. 3 shows a configuration in which it would be possible to envisage solving the problem of the voltage rating of the switches. This is a full bridge configuration connected downstream from an input choke L and presenting four switches disposed as pairs of switches in series, i.e. $S_1$, $S_2$ and also $S'_1$, $S'_2$.

The primary Lp of the transformer $T_1$ has its terminals coupled to the common terminals respectively between $S_1$ and $S_2$ and between $S'_1$ and $S'_2$. This configuration serves to resolve the above-mentioned problem of transistor voltage rating. However, it would be difficult with this layout to implement the solution recommended by U.S. Pat. No. 5,140,512 given that in order to detect the switching state of the transformer, that solution implies detecting that one terminal of the primary is at its high level simultaneously with the other terminal being at its low level.

Figure 4:
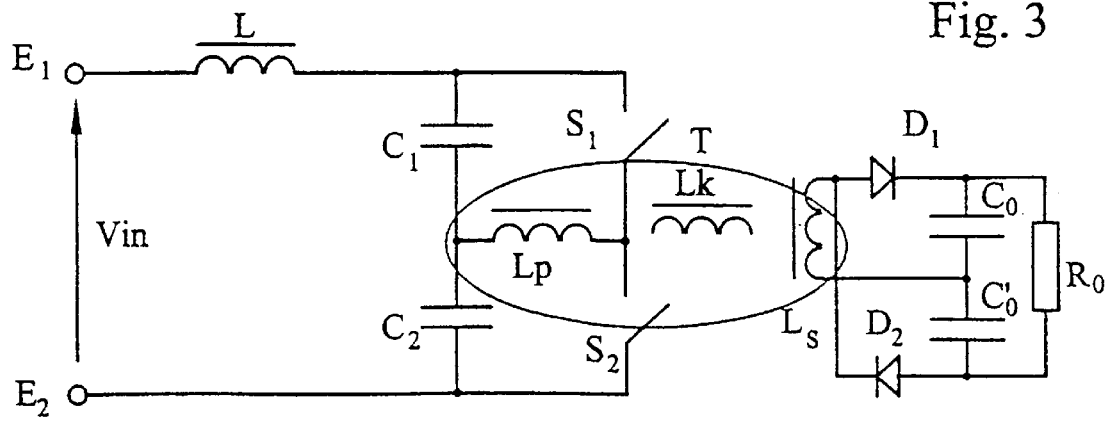
FIG. 4 shows an embodiment of a converter of the invention.

FIG. 4 shows a circuit which, in accordance with the invention, constitutes a half-bridge configuration enabling operation to be obtained that is similar to that of FIG. 3 while using only two switches $S_1$ and $S_2$, with two capacitors in series $C_1$ and $C_2$ being placed instead of and replacing the switches $S'_1$ and $S'_2$ of FIG. 3.

This circuit retains not only the advantages of the layout described in above-mentioned U.S. Pat. No. 4,959,765, but also presents other advantages. In order to implement the zero voltage switching technique described in U.S. Pat. No. 5,140,512, it suffices to detect the voltage of the primary Lp at the point common to the switches $S_1$ and $S_2$, with the voltage at the other terminal of the primary Lp being maintained by the bridge of capacitors $C_1$ and $C_2$.

In addition, since the two switches $S_1$ and $S_2$ are connected in series, this provides automatic protection in the event of one of the switches being accidentally short-circuited. When a switch remains short-circuited, the transformer does not switch, so zero voltage is not detected at the terminals of the other switch, and both switches remain controlled to take up the open state.

Figure 5:
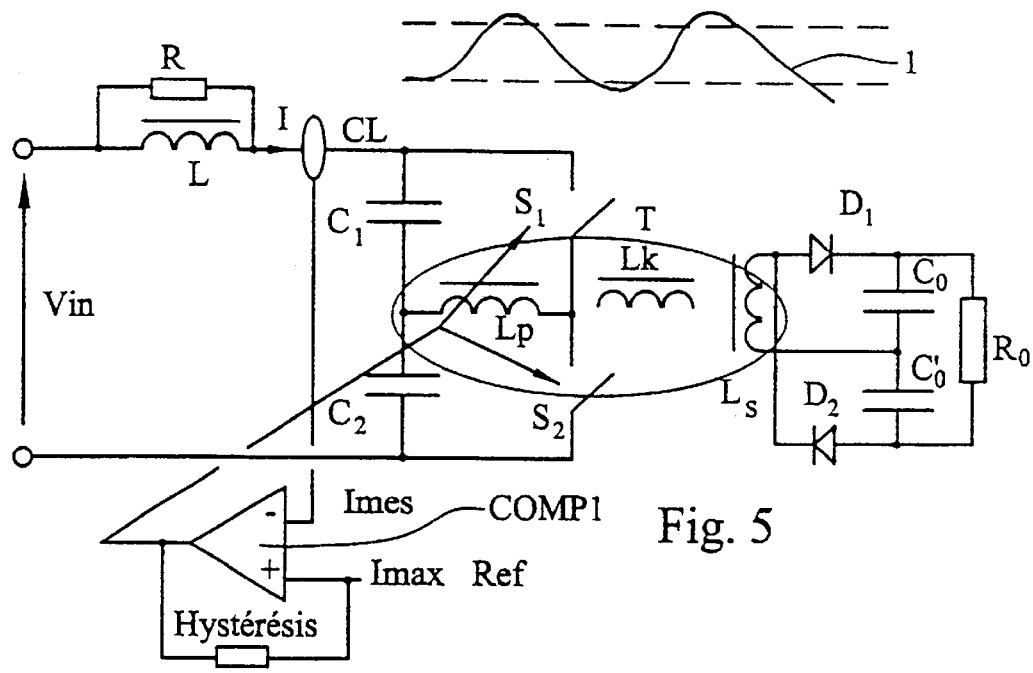
FIG. 5 shows the circuit of FIG. 4 associated with an anti-short-circuit protection device of the invention.

The circuit of FIG. 5 reproduces the circuit of FIG. 4 plus a protection circuit which makes it possible to mitigate the case of a short circuit arising when one of the two switches is accidentally in the closed state while the other switch is normally controlled to take up the closed state. Under such circumstances, the capacitors $C_1$ and $C_2$ discharge through the switches $S_1$ and $S_2$ thereby generating a current peak whose value is limited because of the small amount of energy stored in the capacitors. This current increases the current flowing through the choke L and is detected by a current loop CL. The measured current Imes is compared with a value Imax ref in a comparator COMP1, preferably a comparator with hysteresis, whose output commands the switches $S_1$ and $S_2$ to open. When the comparator COMP1 is merely an operational amplifier, its action needs to be inhibited during switch-on in order to enable the circuit to start.

If the switches $S_1$ and $S_2$ are short-circuited on starting, then protection is not acquired. That is why it is preferable to implement a comparator with hysteresis, in particular of the type having a limiting hysteresis cycle with a high hysteresis threshold and a low hysteresis threshold that makes it possible to limit the current.

Because of the filter constituted by the choke L and the capacitors $C_1$ and $C_2$ the shape of the current curve I shown at the top of FIG. 5 presents a certain amount of overshoot above the high threshold and below the low threshold of the theoretical cycle which thresholds are represented by two horizontal dashed lines. The amplitude of this overshoot depends on the damping provided by a resistor R connected in parallel with the choke L.

In current limiting mode, the power applied to the converter is the product of the input voltage multiplied by the mean limited current. This power can be high and the duration of the hysteresis cycle should be limited so as to allow starting and overload transients to pass through, but the entire converter should be deactivated after a limited length of time so as to avoid dissipating excessive energy.

In current limiting mode and when using insulated grid field effect transistors (MOSFET) as the switches being in their closed state, their parallel diodes are capable of diverting all of the magnetization current flowing in the transformer in either direction through the capacitors $C_1$ and $C_2$, thus making it possible to avoid damaging the switches.

Figure 6:
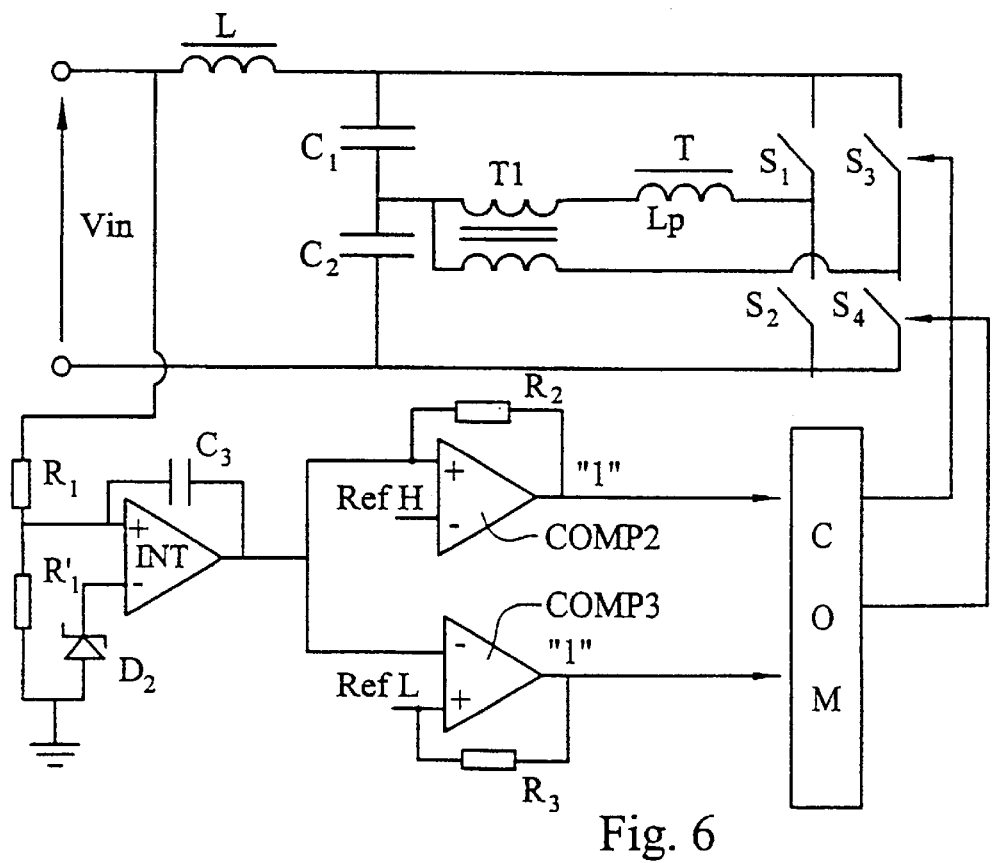
FIG. 6 shows the FIG. 4 circuit associated with a device in accordance with the invention for adjusting voltage.

FIG. 6 shows a variant of the circuit of the invention which associates a device for adjusting the voltage which switches at zero voltage and at zero current. This adjustment possibility does not alter the efficiency of the layout, nor does it alter its protection against short circuits.

In FIG. 6, two additional switches $S_3$ and $S_4$ are connected in series. They have a common terminal connected to a terminal of the primary of a transformer $T_1$ that is small compared with the transformer T. The other terminals of the switches $S_3$ and $S_4$ are connected to the non-common terminals of the switches $S_1$ and $S_2$, respectively. The secondary of the transformer $T_1$ which presents a terminal in common with the primary is in series with the primary Lp of the transformer T between the terminals common firstly to $C_1$ and $C_2$ and secondly to $S_1$ and $S_2$. The switches $S_3$ and $S_4$ which can benefit from the same mutual protection device against short circuits as the switches $S_1$ and $S_2$ (see FIGS. 4 and 5) are controlled either synchronously with the switches $S_1$ and $S_2$ respectively, or else in phase opposition relative thereto.

The transformer $T_1$ has a relatively high transformation ratio, e.g. lying in the range 10:1 to 20:1, as a function of the amplitude desired for voltage adjustment. The primary of $T_1$ is thus controlled by the switches $S_3$ and $S_4$ and the voltage generated on the secondary is added to or subtracted from that of the primary Lp of the main transformer T depending on whether $S_3$ or $S_4$ is synchronous with $S_3$ In the embodiment shown in FIG. 6, the switches $S_3$ and $S_4$ are controlled by a control circuit COM which has three logical modes of operation:

an additive logic mode when the value of the input voltage Vin exceeds a high threshold;

a subtractive mode when the value of the input voltage Vin is below a low threshold; and an inactive mode ($S_3$ and $S_4$ open) when the voltage Vin lies between those two thresholds. The inactive mode is also used to provide protection against short circuits in the same manner as in FIG. 4, this time by detecting the voltage at the point common to the switches $S_3$ and $S_4$. Automatic protection can also be obtained in the same manner as for the switches $S_1$ and $S_2$ (FIG. 5).

The input voltage Vin is applied to a resistor bridge $R_1$, $R'_1$ whose midpoint is connected to the inverting input of an integrator INT having feedback via a capacitor $C_3$. The non-inverting input of the integrator INT has its voltage determined by a zener diode Dz.

The output from the integrator INT is applied to the non-inverting input of a comparator COMP2 having a feedback resistor $R_2$ and to the inverting input of a comparator COMP3 having a feedback resistor $R_3$. The inverting input of the comparator COMP2 receives a reference voltage Ref H representing the high threshold desired for the voltage Vin, and the non-inverting input of the comparator COMP3 receives a voltage Ref L representing the low threshold desired for the voltage Vin.

When Vin is greater than the high threshold, the comparator COMP2 outputs a logic 1 which enables operation of the control circuit so as to control the switches $S_3$ and $S_4$ in additive mode whereby the voltage in the secondary of $T_1$ is added to the voltage in the primary of T. When Vin is below the low threshold, the comparator COMP2 outputs a logic 1 which enables the control circuit COM to operate so as to control the switches $S_3$ and $S_2$ in subtractive mode. In which case the voltage across the terminals of the secondary of $T_1$ is subtracted from the voltage across the terminals of the primary of T.

The comparators COMP2 and COMP3 are preferably comparators with hysteresis.

The voltage adjustment circuit enables a certain bandwidth to be obtained for voltage control while keeping control over voltage excursion.

In a preferred variant, the switches $S_3$ and $S_4$ are controlled in phase opposition relative to each other, but with a phase offset relative to the switches $S_1$ and $S_2$ (and not in phase opposition relative to the switches $S_1$ and $S_2$). To this end, the comparators COMP2 and COMP3 are replaced by phase shifters which control the phase for each switch $S_3$ and $S_4$ relative to the switches $S_1$ and $S_2$ as a function of the voltage Vin, and in particular as a function of the difference between Vin and the reference voltages Ref H and Ref L so as to obtain additive and subtractive modes in phase offset rather than in phase opposition. This makes it possible significantly to decrease residual ripple in the voltage of the signal while still allowing a high degree of efficiency.

By way of example, a converter of the invention can achieve efficiency of the order of 90% to 92% for a converter operating at 100 W/100 v with an input voltage of about 30 V.

What is claimed is:

1. A DC voltage converter comprising first and second input terminals for receiving an input voltage, a choke component having a first terminal coupled to the first input terminal and a second terminal coupled to a first terminal of a capacitive branch which has a second terminal coupled to the second input terminal, first and second switches controlled in opposition, and an output transformer having a primary and a secondary feeding a load, the converter being characterized in that the capacitive branch presents two capacitive components ($C_1$, $C_2$) connected in series with the common terminal thereof being coupled to a first terminal of the primary (Lp) of said output transformer (T), in that the first and second switches ($S_1$, $S_2$) are connected in series and present a common terminal coupled to a second terminal of the primary (Lp) of said output transformer (T), the other terminals of the first and second switches ($S_1$, $S_2$) being coupled respectively to the first and second terminals of the capacitive branch ($C_1$, $C_2$), and in that it includes a device (CL) for measuring the current flowing through said choke component (L) and a comparator (COMP1) comparing said measured current (Imes) with a reference maximum current (Imax ref), and having its output coupled to a control device which controls opening of the first and second switches ($S_1$, $S_2$) whenever the measured current (Imes) exceeds said reference maximum current (Imax ref).

2. A converter according to claim 1, characterized in that it has zero voltage switching control on the basis of the voltage at the terminal common to the first and second switches ($S_1$, $S_2$).

3. A converter according to claim 1, characterized in that said comparator (COMP1) is a comparator with hysteresis.

4. A converter according to claim 1, wherein it has third and fourth switches ($S_3$, $S_4$) connected in series and presenting a common terminal coupled to the first terminal of the primary of an auxiliary transformer ($T_1$), the other terminals of the third and fourth switches ($S_3$, $S_4$) being coupled respectively to the first and second terminals of the capacitive branch ($C_1$, $C_2$), and in that the auxiliary transformer ($T_1$) presents a secondary connected in series with the primary (Lp) of the output transformer (T) between the terminal common to the two capacitive elements ($C_1$, $C_2$) and the terminal common to the first and second switches ($S_1$, $S_2$).

5. A converter according to claim 4, characterized in that it includes a voltage adjustment device for controlling the third and fourth switches ($S_3$, $S_4$) as a function of the input voltage Vin, either in an additive first mode in which the third and fourth switches ($S_3$, $S_4$) are controlled synchronously with the first and second switches ($S_1$, $S_2$) respectively, or in a subtractive second mode in which the third and fourth switches ($S_3$, $S_4$) are controlled in phase opposition with the first and second switches ($S_1$, $S_2$) respectively.

6. A converter according to claim 5, characterized in that the voltage adjustment device comprises first and second threshold comparators (COMP2, COMP3) and a control unit (COM) for controlling the third and fourth switches ($S_3$, $S_4$) so as to cause the third and fourth switches ($S_3$, $S_4$) to operate at least in the first and second modes, the first and second threshold comparators (COMP2, COMP3) having respective first input terminals receiving a signal representative of said input voltage (Vin) and respective second input terminals receiving signals representative respectively of a high threshold (Ref H) and of a low threshold (Ref L) and presenting respective control outputs applied to inputs of the control unit (COM) for causing the control unit (COM) to operate in said first mode and in said second mode, respectively.

7. A converter according to claim 6, characterized in that it includes a device in which at least one of said threshold comparators (COMP2, COMP3) is a comparator with hysteresis.

8. A converter according to claim 4, characterized in that it includes a control voltage adjustment device for the third and fourth switches ($S_3$, $S_4$) which offsets the phases of the third and fourth switches ($S_3$, $S_4$) relative to the phases of the first and second switches ($S_1$, $S_2$) respectively as a function of the input voltage Vin.

9. A converter according to claim 4, wherein it includes zero voltage switching control on the basis of the voltage of the terminal common to the third and fourth switches ($S_3$, $S_4$).

* * * * *